July 25, 1950   W. T. HANNA   2,516,770
TENDER CONVEYER FOR LOCOMOTIVE STOKERS
Filed Oct. 7, 1947   2 Sheets-Sheet 1
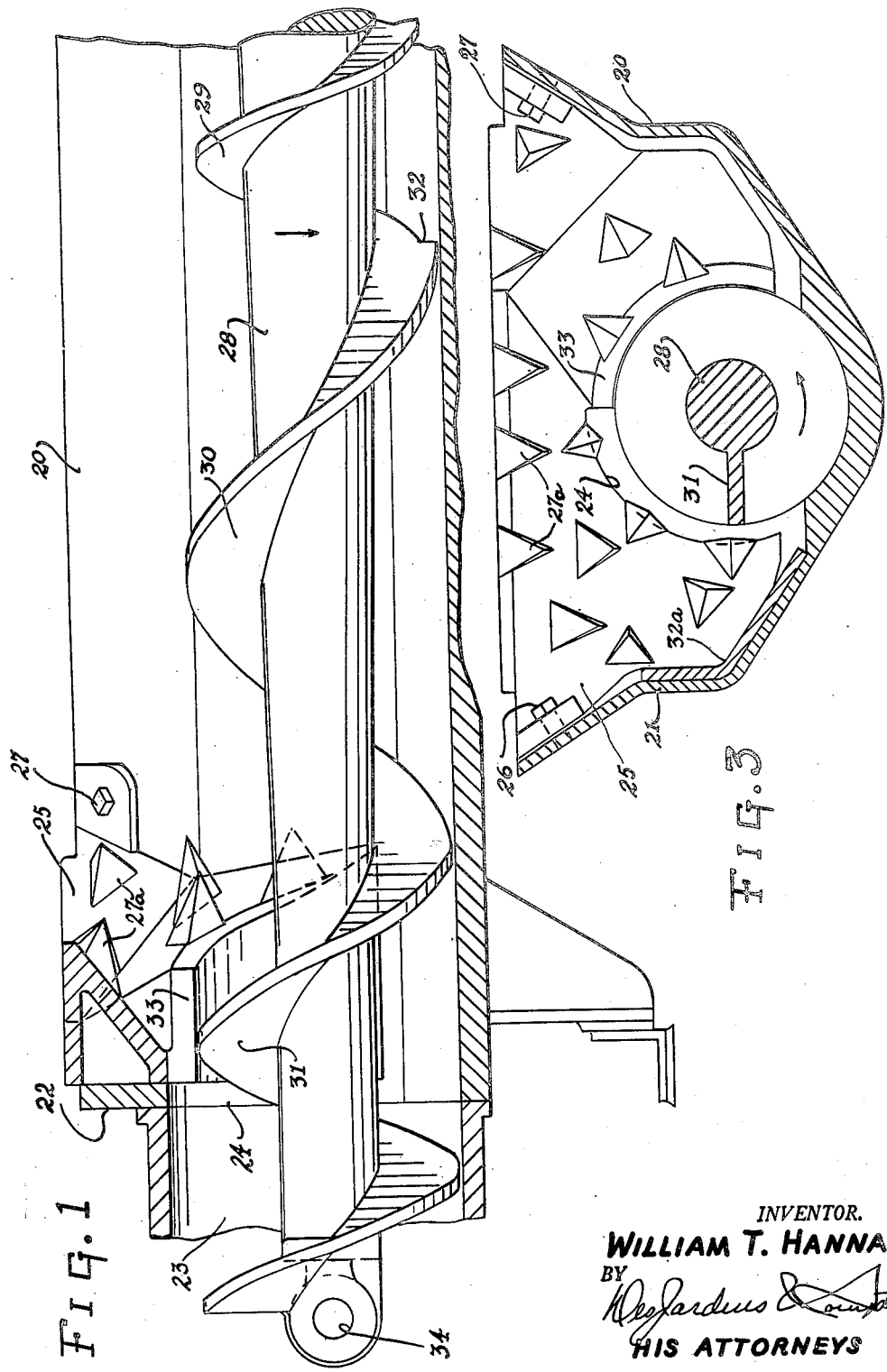
INVENTOR.
WILLIAM T. HANNA
BY
HIS ATTORNEYS

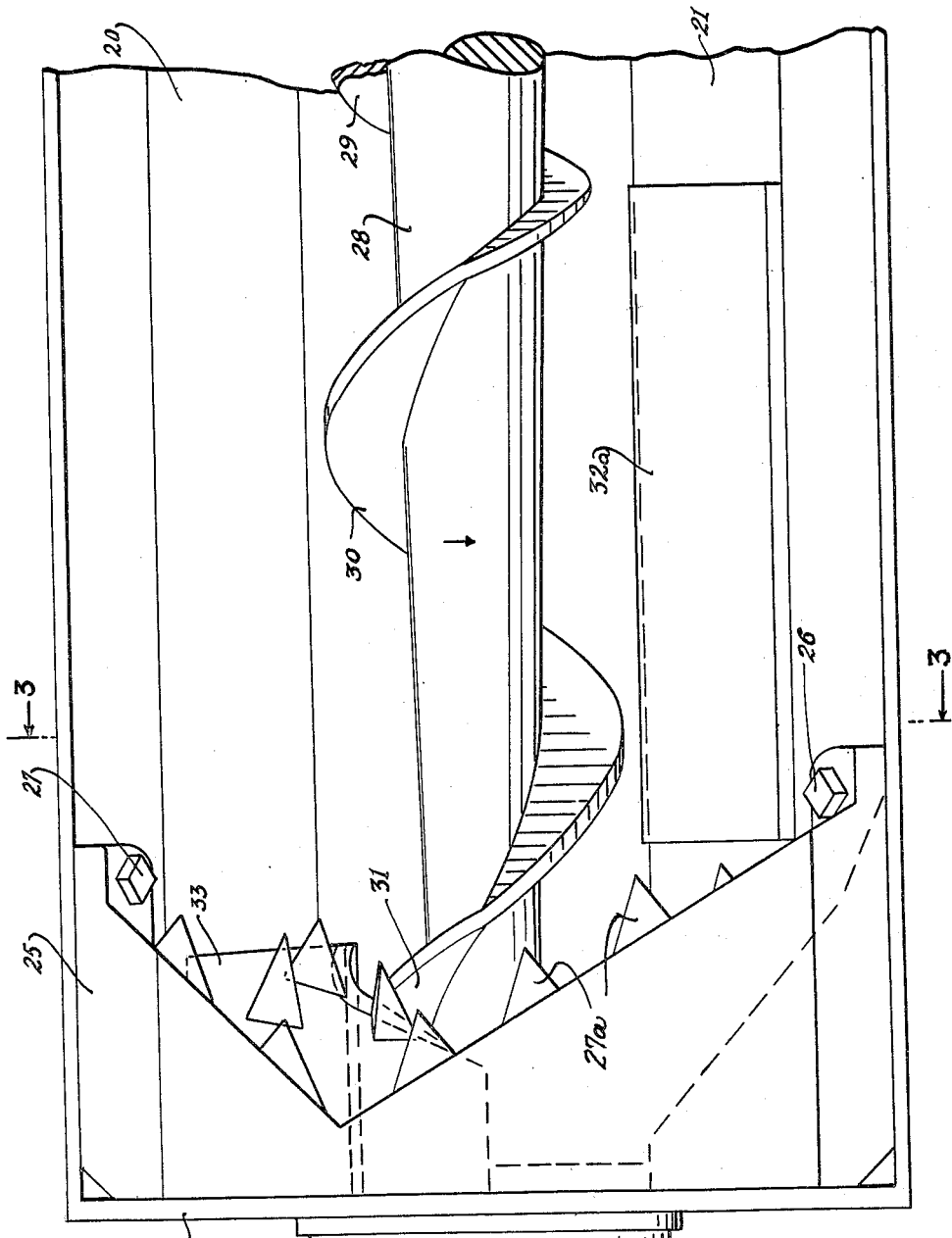

Patented July 25, 1950

2,516,770

UNITED STATES PATENT OFFICE 2,516,770

TENDER CONVEYER FOR LOCOMOTIVE STOKERS

William T. Hanna, Cincinnati, Ohio

Application October 7, 1947, Serial No. 778,342

2 Claims. (Cl. 241—276)

This invention relates to a tender conveyor for a locomotive stoker, and more particularly pertains to one having a rotatable conveyor screw operating in a trough which receives lump fuel, such as coal, from an aperture in the floor of a tender fuel compartment.

In known conveyors of the above type, lumps of fuel are carried, in the turns of a spiral flight on the screw, toward the delivery end of the conveyor trough where they are broken against a crusher plate provided in the end wall of the trough around the delivery conduit into which the fuel is finally forced. Such conveyors will not handle lumps of fuel which are too big to fall between the turns of the spiral flight on the screw, and such oversized lumps tend to be carried on top of the conveyor screw toward the front of the conveyor trough where they impede or clog the action of the conveyor.

I have provided a device in which such clogging action is eliminated, and in which such oversize lumps are crushed and carried into the delivery conduit. I accomplish the crushing and acceptance by the conveyor screw of oversize lumps of fuel by providing along the length of the conveyor screw a place where the pitch of the spiral flight is made abnormally long. Normally such conveyor screws are made with the flight of such pitch that the major portion of the thrusting action is directed along the axis of the trough so as to carry the fuel to the delivery conduit at the delivery end thereof. In my device, the major thrust of the conveyor screw, at the point where the pitch is abnormally long, is directed to a side of the trough so that large lumps of fuel, riding on top of the conveyor screw, are caught and crushed against that sidewall of the trough toward which the screw flight is effective.

Such crushing of fuel lumps against the sidewall of the conveyor trough tends to push the conveyor screw sideways and upwardly in the trough, and, therefore, I provide a bearing plate of cylindrical section in the delivery conduit, against which the end of the screw, which projects into the conduit, may bear.

I also provide a hard wear plate on the inner side wall of the trough against which the fuel is crushed.

Therefore, it is the principal object of my invention to provide a tender conveyor system, for a locomotive stoker, in which oversize lumps of fuel are crushed by the side thrust of a portion of a conveyor screw, against a side wall of the conveyor trough.

Another object of the invention is to provide in such a conveyor system a conveyor screw operating in a trough, part of the spiral flight on the screw giving a thrust to fuel in a direction along the length of the trough and part of the spiral flight on the screw giving a thrust to fuel laterally against one of the side walls of the trough.

A still further object of the invention is to provide novel bearing means for the delivery end of such a conveyor screw to prevent lateral and upward movement of it when fuel is crushed against the side of the trough.

A still further object of the invention is to provide a special wear plate on the side of the trough against which fuel is crushed.

Further objects, and objects relating to the details and economies of construction will definitely appear from the detailed description to follow.

In one instance, I have accomplished the objects of my invention by the devices and means set forth in the following specification. My invention is clearly defined and pointed out in the appended claims.

Structures, constituting the preferred embodiment of my invention, are illustrated in the accompanying drawings, forming a part of the specification, in which:

Fig. 1 is a vertical lengthwise section through the delivery end of the trough but showing the delivery end of the conveyor screw in full.

Fig. 2 is a plan view of the substance of Fig. 1.

Fig. 3 is a section on the line 3—3 of Fig. 2.

In the drawings, the same reference numerals are applied to the same parts throughout the several views, and the section is taken on the section line looking in the direction of the arrows.

Referring to the drawings, I show a fuel trough having side walls 20 and 21, a delivery end wall 22, and a delivery conduit 23, of hollow cylindrical form, extending from a circular delivery aperture 24 in said end wall.

Surrounding the top and sides of aperture 24 on the interior of the trough is a crusher plate 25 secured to the side walls 20 and 21, as by bolts 26 and 27. Crusher plate 25 is provided with crusher points 27a against which fuel lumps conveyed thereagainst are broken and carried from that point into the conduit.

Mounted lengthwise in the trough, for rotation, is a conveyor screw having a shaft 28 with a spiral flight fin thereon including portions 29, 30 and 31 of different pitch and depth, but turning in the same direction and joined together in a unitary continuous conveying flight structure when rotated in the direction of the arrows. The portion 29 of the flight has a, so called, "slow"

pitch, which is normal for such screws, and the major portion of the thrust of its effective action is forward toward the delivery conduit. Beginning at point 32 (Fig. 1) and extending forwardly toward the delivery end of the trough, for approximately one complete turn, is portion 30 of the screw flight. Portion 30 not only has a, so called, "quick" pitch in which its major thrusting action is sideways, but such portion is deeper radially of the shaft. The increase in pitch length and the increased radial depth of the fin makes it possible for oversize lumps of fuel to be caught, pinched and crushed against the side wall 21 of the trough. The fuel thus being reduced to smaller lump size is carried between the turns of the spiral flight toward the conduit, being moved along the trough by entrainment with the remainder of the conveyed fuel, all of which fuel is finally reduced in size, if still too big for the conduit, by the action of points 27a of the crusher plate.

It will be appreciated that the pinching and crushing action of portion 30 of the spiral flight, on a large lump, may take several turns of the screw before the reduction of the entire lump to the necessary size to be received in between the turns of the flight.

After one full turn of "quick" pitch the spiral flight resumes its normal "slow" pitch as at portion 31.

It is apparent from the drawing, Fig. 1, that the conveyor screw has a single continuous spiral flight of varying pitch angle, including the portions 29, 30 and 31. Calculations based on measurements of the drawing show that the portion 29 of the flight has a pitch angle of about 28.4°, portion 30 has a pitch angle of about 59.4° and portion 31 has a pitch angle of about 40°. It is apparent, therefore, that the pitch angles of portions 29 and 31 of the flight are substantially less than 45°, while the pitch angle of portion 30 is substantially greater than 45°, and, further, that the pitch angle of portion 30 of the flight is about twice the pitch angle of portion 29. It is the pitch angle of any portion of the flight that determines the resolution of its thrust into two components, one along a line parallel to the axis of the screw and the other in a direction at right angles to said line. Accordingly, the major portion of the thrust exerted by portions 29 and 31 of the flight on the fuel in the conveyor will be in a direction parallel to the axis of the screw, whereas, on the contrary, the major portion of the thrust exerted by the portion 30 of the screw will be in a transverse direction.

A wear plate 32a of hard material is secured to side wall 21 at a point opposite to portion 30 of the flight to prevent damage to the trough. Such wear plate may be made of manganese steel or an equivalent material.

To take the lateral and upward thrust given to the screw by the action of crushing the fuel lumps against the side wall of the trough, I provide a bearing plate 33 which is secured to the crusher plate. Said bearing plate 33 has a cylindrical concave surface against which the edge of flight portion 31 bears.

Shaft 28 is equipped at the forward end with a transverse hole 34 for coupling to another conveyor screw in a portion of the locomotive conveyor system, in the usual manner.

It will be apparent that, although the special side-thrusting portion of the spiral flight is shown near the delivery end of the trough where it is most needed, it may be positioned anywhere along the conveyor screw to meet the needs in any particular instance of its use.

And, although the special side thrusting portion 30, of the screw, is shown as having but a single turn, it may comprise more or less than a single turn as the occasion for its use demands.

The screw of the instant invention preferably is driven from the rear end, in the usual manner, such mechanism not being shown as it is not pertinent to an understanding of the invention.

I am aware that the device illustrated and described herein is susceptible of considerable variation without departing from the spirit of my invention and, therefore, I claim my invention broadly as indicated by the appended claims.

I claim:

1. In a fuel conveyor system for a locomotive tender, the combination with a fuel-conveying trough adapted to be located under the fuel compartment of the tender, said trough having a wall at the forward delivery end thereof and a fuel conduit extending through said forward wall, of a conveyor screw rotatably mounted in said fuel trough with its delivery end extending into said conduit, said screw having a single continuous spiral flight of varying pitch angle, the rear portion of said flight having a pitch angle substantially less than 45° and a forward portion of said flight having a pitch angle substantially greater than 45°, the pitch angle of said forward portion being about twice the pitch angle of said rear portion, whereby the major portion of the thrust of said rear portion is directed parallel to the axis of the screw while the major portion of the thrust of said forward portion is directed laterally.

2. The combination of claim 1 in which said screw has a portion of its flight in said fuel conduit, which portion has a pitch angle substantially less than 45°.

WILLIAM T. HANNA.

REFERENCES CITED

The following references are of record in the file of this patent:

UNITED STATES PATENTS

| Number | Name | Date |
|---|---|---|
| 201,187 | Markle | Mar. 12, 1878 |
| 1,384,138 | Lower | July 12, 1921 |
| 1,434,049 | Doering | Oct. 31, 1922 |
| 1,606,228 | Hunt | Nov. 9, 1926 |
| 2,006,978 | Wynn | July 2, 1935 |
| 2,032,338 | Anderson | Feb. 25, 1936 |
| 2,150,163 | Hanna | Mar. 14, 1939 |

FOREIGN PATENTS

| Number | Country | Date |
|---|---|---|
| 348,167 | Great Britain | May 4, 1931 |